United States Patent Office 3,452,775
Patented July 1, 1969

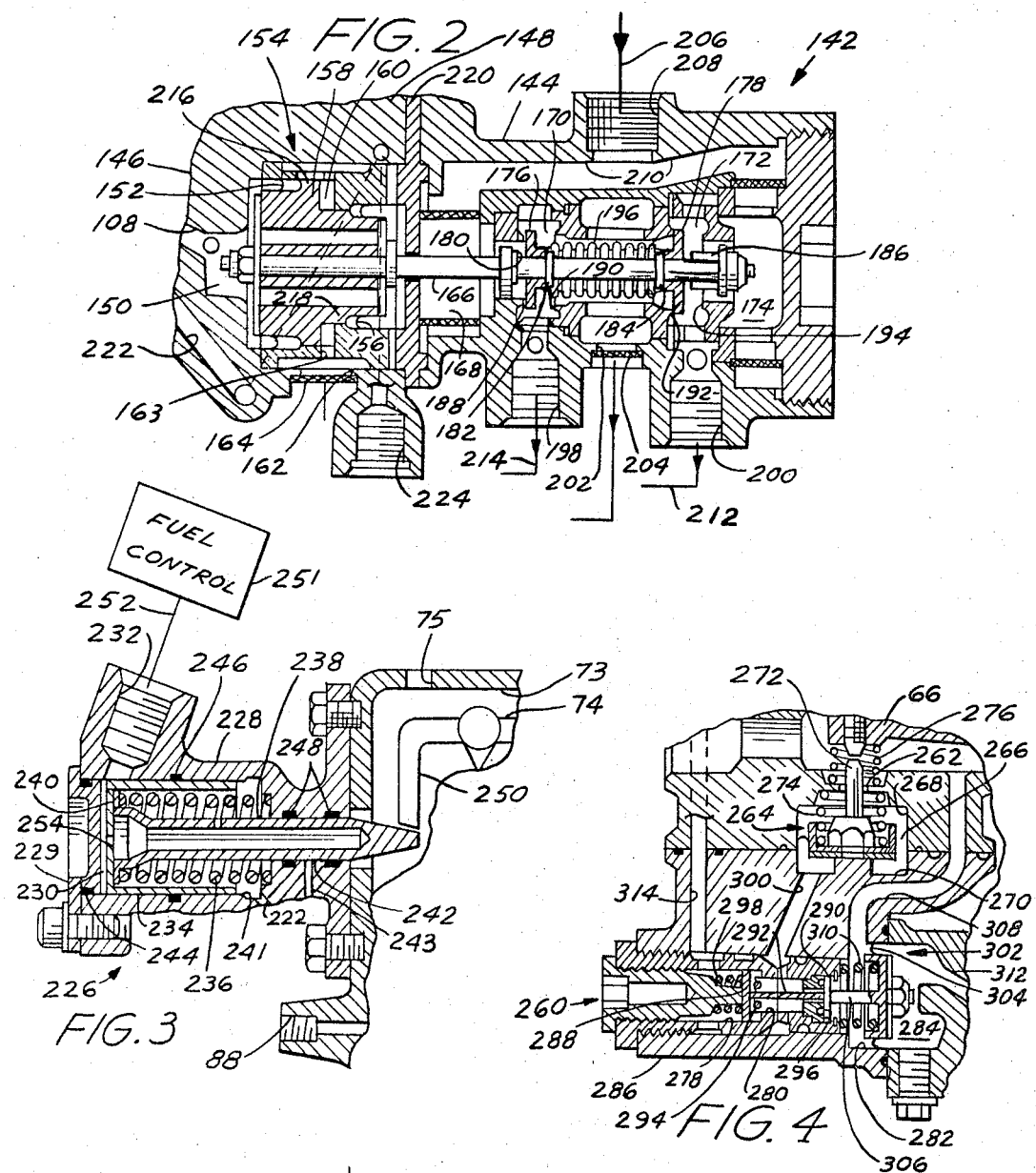

3,452,775
PRESSURE RATIO DEVICE
Julius Alberani, Birmingham, Mich., assignor to Holley Carburetor Company, Warren, Mich., a corporation of Michigan
Filed July 1, 1966, Ser. No. 562,381
Int. Cl. G05d *11/03;* F16k *31/12*
U.S. Cl. 137—115                    6 Claims

ABSTRACT OF THE DISCLOSURE

A device including servo means actuated in response to a predetermined ratio of two pressures for controlling application of a higher pressure to a slave means controlling an intermediate pressure, other embodiments of the device including reset means for varying the predetermined pressure ratio and/or override means for actuating the servo means without regard to the pressure ratio.

---

This invention relates generally to gas turbine engines having a compressor with a bleed valve associated therewith for at times reducing a compressor pressure, and more specifically to the means employed for controlling the bleed valve.

Turbine engines, regardless of whether they employ a single solid compressor, as illustrated, or a split compressor, always encounter the problem of compressor stall. The efficiency of the overall engine is dependent, primarily, on the rate at which air is supplied by the compressor. However, during certain periods of engine operation, some stages of the compressor will supply more air than subsequent stages can accommodate. As a consequence, stalling of certain compressor stages occurs, which results in surging air flow and fluctuations in compressor discharge pressure, thereby setting up dangerous engine vibrations. This problem is overcome by the provision of a compressor bleed assembly which serves to bleed certain stages of the compressor.

Accordingly, a general object of the invention is to provide a pressure ratio responsive means adapted to control the position of a slave member such as a compressor bleed valve.

Another object of the invention is to provide such a device which includes a pressure reversing mechanism, rather than simply an "on-off" mechanism.

Still another object of the invention is to provide such a device which may incorporate a system capable of overriding the pressure ratio system to open the compressor bleed valves when supplied with a high pressure fuel signal.

A further object of the invention is to provide such a device which may additionally incorporate a reset system capable of varying the selected controlling pressure ratio, depending upon whether one of the pressures involved is increasing or decreasing.

Other objects and advantages of the invention will become apparent from the following written description, when considered in conjunction with the attached drawings wherein:

FIGURE 2 is a fragmentary cross-sectional view illustrating the portion of the invention not shown by FIGURE 1;

FIGURES 3 and 4 are fragmentary cross-sectional views illustrating optional modifications of the invention; and FIGURE 5 is a graph illustrating a characteristic of the modified invention.

Figures 1, 1A:
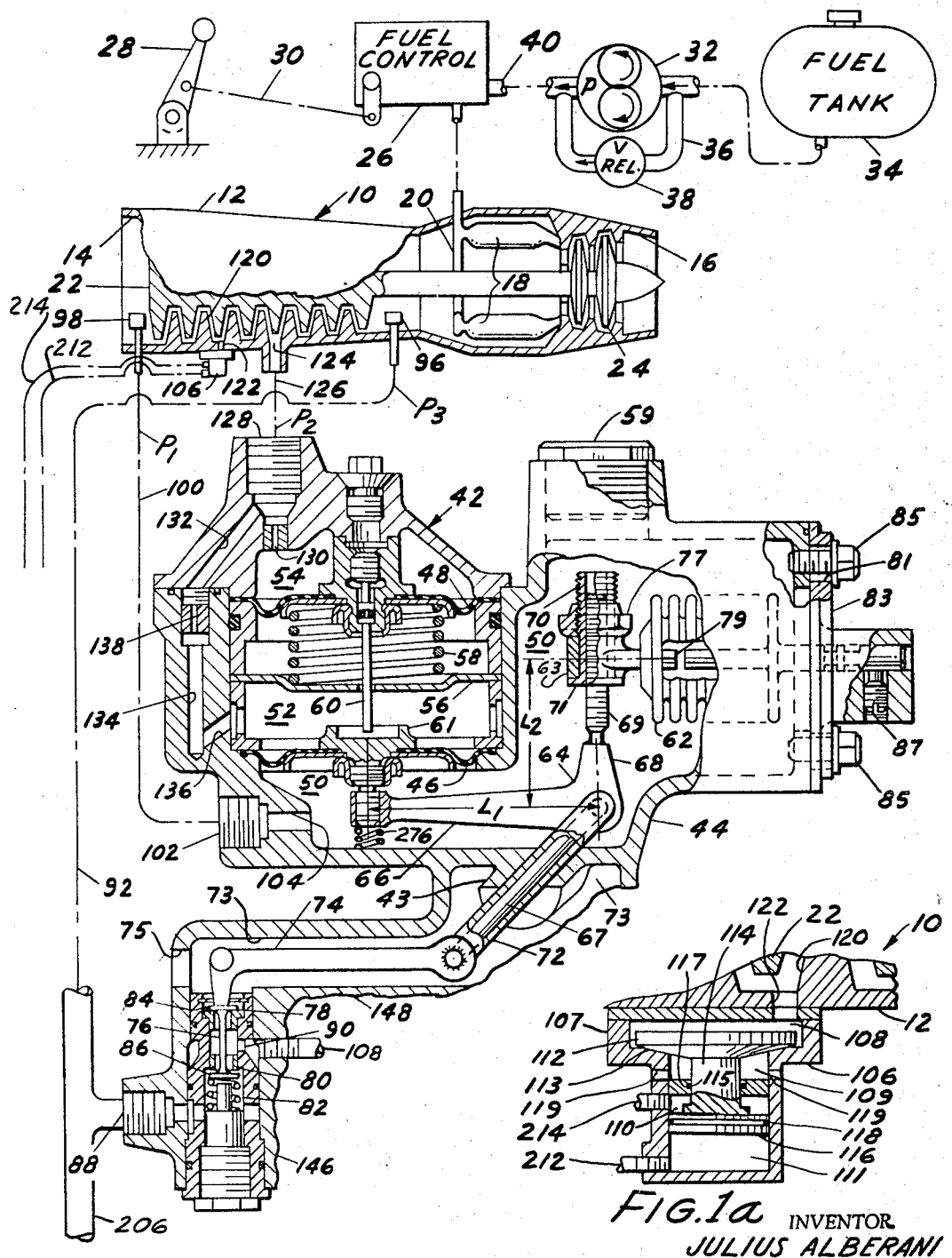
FIGURE 1 is a schematic view, with portions thereof cut away and in cross-section, illustrating the adaptation of a portion of the invention to a gas turbine engine.
FIGURE 1a is an enlarged fragmentary cross-sectional view of a portion of FIGURE 1.

Referring now in greater detail to the drawings, FIGURE 1 illustrates a turbine engine 10 having an outer housing 12 with an air intake 14 and an exhaust nozzle 16. A combustion chamber 18 supplied by a fuel distribution ring 20 is located between the compressor 22 and the turbine 24.

The fuel distribution ring 20 receives metered fuel from a fuel control unit 26 which responds to an input request signal created by the pilot control lever 28 and transmitted by the linkage 30, along with other appropriate input signals created by other means responsive to additional operating conditions such as temperature, speed, altitude and compressor pressure. These various other input signal means do not form a part of the invention and are well known in the art; accordingly, they are not illustrated.

A gear pump 32 adapted to receive fuel from the fuel tank 34 may, of course, be provided in order to supply unmetered fuel to the control 26. A bypass conduit 36 having a relief valve 38 connected serially therewith may also be provided in order to maintain a relatively constant fuel pressure in conduit 40.

The pressure ratio device, illustrated generally at 42, is comprised of a body 44 containing diaphragms 46 and 48 secured therein so as to provide three distinct chambers 50, 52 and 54. Bracket 56 in chamber 52 serves as a mechanical stop to fixedly contain one end of spring 58, the other end of spring 58 operating against diaphragm 48. A stem 60 is rigidly attached in any convenient manner to diaphragm 48 and may, at times, come into contact with the seat 61, for a purpose which will be described later. Seat 61 is rigidly attached in any suitable manner to diaphragm 46, which is connected with a collar extension 63 of an evacuated bellows 62 by means of a lever 64 located in chamber 50. Lever 64 is comprised of arm 66 and 68 which are shown to be substantially perpendicular to one another. Arm 68 includes a threaded extension 69, and the effective length $L_2$ of arm 68 may be changed by some adjustment means, such as by an internally and externally threaded cylindrical cap 70 including a flange 71 on which the bellows collar 63 may rest. The collar 63 is held in place against the flange 71 by a locking nut 77.

The bellows shaft is broken, as at 79, to facilitate the adjustment of the bellows spring load by permitting movement of one end of the bellows 62 while the other end remains fixed. Once collar 63 is locked in the position desired, the evacuated bellows 62 may be properly aligned by means of slots 81 on the movable cover 83 and screws 85. Set screw 87 serves to hold the bellows 62 in place longitudinally.

A rigidly fixed tube 72 press-fitted into a boss 43 of body 44 acts both as a bearing for a shaft 67 and as spacer preventing the lever 64 from moving laterally. The shaft 67 is rigidly fixed at its ends to the lever 64 and to a lever 74 located in chamber 73 so as to transmit movement of lever 64 via the lever 74 to a servo valve 76. Lever 74, like lever 64, is also prevented from moving laterally by the rigidly mounted spacer tube 72. Chamber 73 is continually vented to the atmosphere via port 75 for a purpose which will be described later.

Servo valve 76 closes either upon seat 78 or upon seat 80, depending upon the direction of movement of lever 74. When lever 74 is lifted away from servo valve 76, spring 82 and pressure $P_3$ will move the valve 76 against seat 80 and away from seat 78, thereby preventing communication between inlet 88 and outlet 90 and providing communication between chamber 73 and outlet 90 through the clearance 84. When lever 74 is moved against valve 76, spring 82 is compressed to reverse the above condition; that is, communication between chamber 73 and outlet 90 is prevented, and communication between inlet 88 and outlet 90 is accomplished through the clearance 86, as shown in FIGURE 1. The purpose of the above operation valve 76 will be described further on in the specification.

One end of conduit 92 is in continual communication with inlet 88, while the other end thereof is continually exposed to compressor outlet pressure $P_3$, as by means of a suitable pressure probe 96. A second pressure probe 98 is located upstream of the compressor 22 so as to sense and communicate the compressor inlet pressure $P_1$ to conduit 100, inlet 102 and thence via conduit 104 to chamber 50.

Housing 106, which may be either an integral part of the general housing 12 or separately attached thereto, is better illustrated in FIGURE 1a. The housing 106 is comprised of a body 107 formed to provide chambers 108, 109, 110 and 111. A valve 112 at times prevents communication between the chambers 108 and 109 by seating against a valve seat 113. A stem 114 extends from the valve 112, through the chamber 109 and an opening 115 into the chamber 110, wherein a flange 116 formed on the stem 114 serves as a movable wall between the chambers 110 and 111. Seals 117 and 118 surround the stem 114 and the flange 116, respectively. Chamber 109 on the under side of the valve 112 communicates with the atmosphere via ports 119, while chamber 108 on the upper side of valve 112 communicates with a selected stage 120 of the compressor 22 via port 122.

An intermediate pressure $P_2$ from a selected stage 124 of the compressor 22 is in continual communication with an inlet 128 of pressure ratio device 42 via a conduit 126. Conduit 126 thus communicates with chamber 54 via inlet 128 and restriction 130, and with chamber 52 via conduits 132, 134 and 136 and restriction 138.

FIGURE 2 illustrates a pressure reversing device 142 which is used in conjunction with the pressure ratio device 42. The device 142 comprises a body 144 which may be formed as an integral part of the pressure ratio body 44 and connected thereto at the broken edges 146 and 148, so as to be interposed in the system between outlet 90 and the bleed valve housing 106 in a manner to be described.

A conduit 108 communicates between the outlet 90 and a chamber 150 adjacent the larger diaphragm 152 of a diaphragm assembly 154. The assembly 154 includes, in addition to the diaphragm 152, smaller diaphragm 156, the diaphragms 152 and 156 being separated by a spacer 158 slidably mounted within the housing 144. The chamber 160 formed between the diaphragms 152 and 156 is exposed to ambient pressure $P_4$ via openings 162 and 163. A screen 164 may cover the opening 162 to keep out impurities.

A stem 166, secured to the spacer 158, extends from the smaller diaphragm 156 end thereof, through a chamber 168 adjacent the diaphragm 156, and thence through adjacent chambers 170 and 172, into an end chamber 174.

A pair of collars 176 and 178 are slidably mounted on the stem 166 between shoulders 180/182 and 184/186, respectively, formed on the stem. The collars 176 and 178 serve as valves which alternately block off communication between the chambers 168/170 and 170/172, respectively, as they are actuated back and forth between fixed valve seats 188/190 and 192/194, respectively, in a manner which will be described later. A bellows 196 is mounted between the collars 176 and 178, around the stem 166, for a purpose to be described.

By virtue of the action of valves 176 and 178, the chamber 170 is alternately in communication with outlets 198 and 200, which are formed in the housing 144. However, the chamber 170 is at all times in communication with ambient pressure $P_4$ via an opening 202 formed in the housing 144. A screen 204 may be mounted in the opening 202.

A branch conduit 206 communicates between the conduit 92 (FIGURE 1) and an inlet 208 formed in the housing 144. A passage 210 communicates between the inlet 208 and the chambers 168 and 174. A conduit 212 communicates between the outlet 198 and the chamber 111 (FIGURE 1a) of the housing 106, while a conduit 214 communicates between the outlet 200 and the chamber 110 of the housing 106.

OPERATION

In describing the operation of the pressure ratio device disclosed herein, which is provided for controlling a compressor bleed actuator, it may be best to first define the respective relationships of the pressure involved. In the embodiment disclosed, compressor inlet pressure $P_1$ is the lowest pressure. Compressor discharge pressure $P_3$ is the highest pressure involved, with pressure $P_2$ being some intermediate pressure between $P_1$ and $P_3$. Atmospheric or ambient pressure $P_4$ would be equal to or less than $P_1$.

As explained in Patent No. 3,219,309, issued in the name of J. Alberani on Nov. 23, 1965, any selected stage of the compressor can be regulated by controlling the ratio, $P_2/P_1$, in accordance with the formula $$\frac{P_2}{P_1} = \frac{(\text{Area of bellows 62})(L_2)}{(\text{Area of diaphragm 46})(L_1)} + 1$$

wherein $L_2$ is equal to the length of arm 68 of lever 64, and $L_1$ is the length of arm 66 of lever 64.

It can thus readily be seen that the controlling ratio of $P_2/P_1$ can be changed to any desired ratio merely by changing the area of the diaphragm 46, the area of the evacuated bellows 62, or the length of the levers $L_1$ or $L_2$.

The overall operating principle of the invention is that bleeding of the stage 120 of the compressor is accomplished by opening the valve 112 under certain conditions of engine operation so that air (excess pressure) can escape into the atmosphere through ports 122 and 119. The pressure at the stage 120 of the compressor to be bled is somewhere between $P_1$ and $P_3$ pressure. When $P_3$ pressure is supplied to chamber 111 and $P_4$ pressure is supplied to chamber 110, the pressure force on piston 116 causes valve 112 to open. When the pressures are reversed so that $P_3$ pressure is supplied to chamber 110 and $P_4$ pressure is supplied to chamber 111, the pressure force on piston 116 causes the bleed valve 112 to close. The devices 42 and 142, through the above described cooperation of the diaphragm 46, bellows 62, lever 64, lever 74 and valve 76, and through the action of the valves 176 and 178, control the alternating supply of the high $P_3$ and low $P_4$ pressures to chambers 110 and 111.

Let it now be assumed that the engine 10 is being operated at conditions which produce a pressure ratio $P_2\%P_1$ which is below the controlling ratio, as determined by the design and adjustment of device 42. Under these conditions, the resultant force of the bellows $62 \times L_2$ would be greater than the resultant force of the diaphragm $46 \times L_1$, thereby causing lever 64 to be rotated in a clockwise direction. This would rotate the lever 74 away from servo valve 76, causing the latter to move upwardly under the force of the spring 82 and pressure $P_3$ so as to open the port 84 and close the port 86.

With the servo valve 76 in the above described position so that port 84 is open and port 86 is closed, ambient pressure $P_4$ is supplied through the outlet 90 and the conduit 108 to the chamber 150 to the left of the diaphragm 152. $P_3$ pressure, which enters the chamber 168 via the inlet 208 and the passage 210, acting upon the diaphragm 156, will move the piston assembly 154 to the left in FIGURE 2, thereby moving the valves 176 and 178 against seats 188 and 192 respectively. This will permit air at ambient pressure $P_4$ to be communicated from the chamber 170 through the outlet 198 and the conduit 214 to the chamber 110 of the bleed housing 106. At the same time compressor discharge air at pressure $P_3$ which enters via the inlet 208 will be communicated to the chamber 111 of bleed housing 106 via the passage 210, the chamber 174, the outlet 200 and the conduit 212. Under these conditions, the bleed valve 112 (FIGURE 1a) would be forced upwardly until the stop 216 contacts the wall between chambers 109 and 110, permitting the bleeding of excess air from stage 120 to the atmosphere, via ports 122 and 119.

Let it now be assumed that the ratio $P_2/P_1$ is greater than the control ratio, as determined by the selected sizes of diaphragm 46 and bellows 62 and the adjustments of the effective arm lengths of lever 64. The force of diaphragm $46 \times L_1$ would then be greater than the force of bellows $62 \times L_2$. This unbalanced force would cause the shaft 72 to rotate counterclockwise, thereby forcing servo valve 76 downwardly against the force of the spring 82 and pressure $P_3$ so as to close port 84 and open port 86. The high pressure $P_3$ will then communicate with the chamber 150 (FIGURE 2) via conduit 108. Since the diaphragm 152 is larger than the diaphragm 156, the latter being continually exposed to pressure $P_3$ in the chamber 168, the assembly 154 will move to the right in FIGURE 2. This, of course, will move the valves 176 and 178 against seats 190 and 194, respectively, and permit ambient pressure $P_4$ to be communicated via the chamber 170, the outlet 200 and the conduit 212 to the chamber 111 of the housing 106; likewise, $P_3$ pressure will be communicated via the chamber 168, the outlet 198 and the conduit 214 to the chamber 110 of the housing 106. Under these conditions, the bleed valve 112 (FIGURE 1a) would be forced downwardly against the seat 113 and bleeding of stage 120 could not occur.

Referring once again to FIGURE 2, it will be recalled that the collar type valves 176 and 178 are slidably mounted on the stem 166 between the shoulders 180/182 and 184/186 formed thereon, the bellows 196 being connected at its ends to the collars 176 and 178 in any suitable manner. Such an arrangement ensures optimum sealing conditions between the valves 176 and 178 and their respective seats 188/190 and 192/194, regardless of which direction the stem 166 is moving. For example, when the stem 166 is moving to the right, the valve 176 will first contact the seat 190, but stem 166 will continue to move through the now stationary valve 176, causing the valve 178 to come into contact with the seat 194. The bellows 196 will merely expand slightly during the later stage. Likewise, moving leftwardly, the rear valve 178 would now contact the seat 192 first, permitting the stem 166 to continue to move through the valve 178 until such time as valve 176 comes into contact with its seat 188. The clearance between the valves 176 and 178 and the stem 166 is such that air flow may occur therethrough. This permits communication between the chambers 168 and 174 through the inside portion of the bellows 196, thus preventing contamination which could interfere with the usual slidably mounted system.

As was explained in the above mentioned Patent 3,219,309, the additional diaphragm 48 has been incorporated in the system as a safety device. In other words, there is the possibility that diaphragm 46 may become ruptured. If this were to happen, it can be seen that the pressure in chamber 54 would act upon the area of diaphragm 48 in the same manner in which the pressure in chamber 52 had acted upon the area of diaphragm 46. Downward movement of diaphragm 48 would move the stem 60 downwardly until it came into contact with seat 61, thereafter causing arm 66 of lever 64 to move in the same manner as it had previously been influenced by diaphragm 46. In much the same manner, the sliding piston 158 will serve as a two-diameter pressure responsive safety device should either or both the diaphragms 152 and 156 become ruptured. Some leakage would occur past the outer surfaces 216 and 218 of the piston 158, but the system would still be functional until the ruptured diaphragms are replaced.

It may be noted that housing 144 is a two-piece housing, the two parts thereof being separated by a heat shield 220, which may be formed of any suitable heat resistant material, such as Mycalux. The reason for this is that the compressor discharge air at pressure $P_3$ is normally at a temperature of approximately 750–800° F. and, hence, should not be transferred to the pressure ratio device 42. In addition to the heat shield 220, fuel at a substantially lower temperature is caused to continuously flow around the pressure responsive assembly 154 through a passage 222 and out through an outlet 224, from a source which will now be discussed.

FUEL CONTROL OVERRIDE SYSTEM

A fuel control override system 226 is illustrated in FIGURE 3. This system includes a housing 228 and end cap 229 forming a chamber 230 therein, and an inlet 232 communicating with the chamber 230. A piston 234 is slidably mounted in the chamber 230 and urged toward the left in the figure by means of some suitable resilient means, such as a spring 236. A plunger 238 having a flange 240 mounted between the piston 234 and the spring 236 extends from chambers 230 and 241 through an opening 242 formed in a wall of the housing and into the chamber 73 in which the lever 74 is pivotally mounted. A drain line 243 and seals 248 prevent leakage from the chamber 241 to chamber 73 while a seal 246 prevents excess leakage from chamber 230 to chamber 241. A seal 244 prevents leakage from chamber 230 to the atmosphere. An extension 250 is formed on the end of the lever 74 and is at times contacted by the plunger 238. It may be noted that when the plunger 238 contacts the extension 250, the lever 74 will be pivoted upwardly, thereby permitting the servo spring 82 (FIGURE 1) to lift the servo valve 76, blocking off the port 86 and opening the port 84. The chamber 150 in FIGURE 2 would thus be exposed to ambient air, with the result that valve assembly 176, 178 and 196 would be moved leftwardly in FIGURE 2, as described above. It is during periods of so-called "snap" or rapid deceleration that the resultant high pressure from the usual fuel control, represented generally by 251, via a conduit 252 and the inlet 232 would push the piston 234, and hence the plunger 238, to the right in FIGURE 3, thereby lifting the lever 74 as just described. This would prevent flameout or compressor stall by opening the stage 120 (FIGURE 1a) to the bleed outlet 119 as a result of leftward movement of the valves 176 and 178 (FIGURE 2), in the manner described above.

Under normal operating conditions, an intermediate pressure from the fuel control 251 provides cooling fuel flow via conduit 252 and the inlet 232 to the chamber 230, from whence it flows through a restriction 254 into the chamber 241, and through conduit 222, which is ported around diaphragm assembly 154, and out the outlet 224 back to the fuel control 251.

*Reset system*

A reset system 260 is illustrated in FIGURE 4. This system may be added to the housing 44 of FIGURE 1 by reshaping the housing to include an additional recess adjacent the chamber 50 and in communication therewith by means of an opening 262 therebetween. A diaphragm assembly 264 is mounted in the recess such that the diaphragm 266 thereof divides the recess into two variable chambers 268 and 270 by forming a movable wall therebetween. A stem 272 extends from the diaphragm 266 through the opening 262 for at times contacting the arm 66 of the lever 64. A spring 274 having one end thereof mounted against a wall of the chamber urges the diaphragm 266 and stem 272 downwardly away from the opening 262. A spring 276 mounted in the chamber 50 urges the arm 66 upwardly away from the opening 262.

Chambers 278, 280, 282 and 284 are formed in an adjacent recess in a housing 286, which may be an integral part of housing 44 or attached thereto. A pair of valves 288 and 290 having a stem 292 connected therebetween through the chamber 280 are slidably mounted in the chambers 278 and 282 such that they alternately block off communication between chambers 278/280 and 280/282, respectively, by alternately seating against valve seats 294 and 296. A spring mounted in the chamber 278 urges the valves to the right in the figure.

A passage 300 communicates between the chamber 270 and the chamber 280 formed intermediate the valve seats 294 and 296. A second diaphragm assembly 302 is mounted in the chambers 282 and 284 adjacent the valve 290. The assembly 302 includes a diaphragm 304 which forms a movable wall between the chambers 282 and 284 and includes a stem 306 extending from the diaphragm 304 through the chamber 282 and in contact with the valve 290. A passage 308 communicates air at ambient pressure $P_4$ from the chamber 50 to the chamber 282, and a spring 310 mounted in the chamber 282 urges the diaphragm 304 and stem 306 away from the valve 290. An additional passage 312 communicates between the chamber 284 and the servo chamber intermediate the servo valve seats 78 and 80 in any suitable manner. Still another passage 314 communicates between the passage 134 (FIGURE 1) and the chamber 278.

The operation of the reset system 260 may best be described by reference to FIGURE 5. Assume, therefore, that compressor inlet pressure $P_1$ remains constant while the selected intermedaite pressure $P_2$ is increasing, as upwardly along the vertical line of FIGURE 5, between valves A and B. Under these conditions, as previously described, port 84 is open and port 86 is closed, so long as the $P_2/P_1$ ratio is below the control ratio represented by point C of curve D. This permits ambient air to be communicated to the chamber 284 via the passage 312. Since ambient air is also present on the other side of the diaphragm 304 in the chamber 282 via the passage 308, the diaphragm assembly 302 will be pushed rightwardly in FIGURE 4 by spring 310 and the valve assembly 288/292/290 pushed rightwardly by the spring 298. Hence, ambient air will be communicated to the chamber 270 via the chamber 280 and the passage 300. As such, the stem 272 will not be in contact with the arm 66, and, at the preselected $P_2/P_1$ ratio, represented by point C, the servo valve 76 will be forced downwardly in FIGURE 1, in the normal manner discussed above, with the result that the selected compressor stage 22 will be bled to the atmosphere so long as pressure $P_2$ remains lower than that represented by point C.

Opening of the servo port 86 will, of course, permit compressor discharge pressure $P_3$ to be communicated via the passage 312 to the chamber 284, moving the diaphragm 304 and stem 306 to the left in FIGURE 4, and causing the valve 290 to be seated on the seat 296 and the valve 288 to leave the seat 294. Air at the intermediate pressure $P_2$ is thus communicated via the passage 314, the chambers 278 and 280, and the passage 300 to the chamber 270, moving the stem 272 upwardly into contact with the arm 66. The resultant upward force on the small diaphragm 266 subtracts from the downward force of $P_2$ pressure on the diaphragm 46 (FIG. 1), likewise, the downward force of the spring 274 subtracts from the normal upward force of the spring 276 against the arm 66 once the stem 272 contacts the arm. The result is that, once pressure $P_2$ has reached a valve greater than G and begins decreasing, at the constant $P_1$, the effect of the decreasing $P_2$ on the servo valve 76 will be changed by virtue of the above described additional upward forces, hereinafter referred to as $F_R$, on the arm 66. Hence, bleeding of the compressor stage 22 will occur at a higher $P_2'/P_1$ ratio, represented by point G on curve H, since the greater $P_2'$ pressure would be diminished by the amount of the upward force of the diaphragm 266 and the stem 272. In other words the net result of the higher $P_2'$ at point G is $$\frac{P_2' - F_R}{P_1}$$

which would equal the value of the $P_2/P_1$ ratio at point C.

Thus, with the addition of the reset system 260, for particular engine requirements, the $P_2/P_1$ ratio may be made variable, the specific ratio depending upon whether the selected intermediate pressure $P_2$ is increasing or decreasing.

The invention and the modifications thereof have been disclosed and described in conjunction with a gas turbine engine only by way of example, since it is apparent that the invention could be practiced in any environment requiring operation by a constant pressure ratio. Accordingly, no limitations other than those defined by the scope of the appended claims are intended.

What I claim as my invention is:

1. A pressure ratio device, comprising means for connection to sources of a plurality of pressures; servo means; means for actuating said servo means in response to a predetermined ratio of two of said plurality of pressures for controlling the flow of the highest of said plurality of pressures; slave means for bleeding off a pressure intermediate said two of said plurality of pressures, said slave means having opposite sides; means for alternately supplying the highest of said plurality of pressures to one or the other of said opposite sides of said slave means; said slave means being actuated by said highest pressure supplied in response to actuation of said servo means and including pressure responsive means, an inlet for said highest pressure, a pair of outlets and valve means operatively connected to said pressure responsive means for alternately controlling the flow of said highest pressure through one or the other of said pair of outlets, said pressure responsive means including a pair of diaphragms and an associated two-diameter piston serving as the emergency pressure responsive means should either of said diaphragms fail.

2. A pressure ratio device, comprising means for connection to sources of a plurality of pressures; servo means; means for actuating said servo means in response to a predetermined ratio of two of said plurality of pressures for controlling the flow of the highest of said plurality of pressures; slave means for bleeding off a pressure intermediate said two of said plurality of pressures, said slave means having opposite sides; means for alternately supplying the highest of said plurality of pressures to one or the other of said opposite sides of said slave means; said slave means being actuated by said highest pressure supplied in response to actuation of said servo means and including pressure responsive means, an inlet for said highest pressure, a pair of outlets and valve means operatively connected to said pressure responsive means for alternately controlling the flow of said highest pressure through said pair of outlets, said valve means including a pair of double-acting valves.

3. The device described in claim 2 wherein a bellows is connected at its ends to said pair of double acting valves.

4. A pressure ratio device, comprising means for connection to sources of a plurality of pressures; servo means; means for actuating said servo means in response to a predetermined ratio of two of said plurality of pressures for controlling the flow of the highest of said plurality of pressures; slave means for bleeding off a pressure intermediate said two of said plurality of pressures, said slave means having opposite sides; means for alternately supplying the highest of said plurality of pressures to one or the other of said opposite sides of said slave means; said slave means being actuated by said highest pressure supplied in response to actuation of said servo means and including pressure responsive means, an inlet for said highest pressure, a pair of outlets and valve means operatively connected to said pressure responsive means for alternately controlling the flow of said highest pressure through said pair of outlets; and means for preventing the transfer of heat from the area around said valve means to the area around said pressure responsive means.

5. A pressure ratio device, comprising means for connection to sources of a plurality of pressures; servo means for actuating said servo means in response to a predetermined ratio of two of said plurality of pressures for controlling the flow of the highest of said plurality of pressures; slave means for bleeding off a pressure intermediate said two of said plurality of pressures, said slave means having opposite sides; means for alternately supplying the highest of said plurality of pressures to one or the other of said opposite sides of said slave means and being actuated by said highest pressure supplied in response to actuation of said servo means; and override means for actuating said servo means regardless of the ratio of said two of said plurality of pressures, said override means including a slidably mounted piston, a plunger operatively connected to said piston and lever means between said plunger and said servo means.

6. A pressure ratio device, comprising means for connection to sources of a plurality of pressures; servo means; means for actuating said servo means in response to a predetermined ratio of two of said plurality of pressures for controlling the flow of the highest of said plurality of pressures; slave means for bleeding off a pressure intermediate said two of said plurality of pressures, said slave means having opposite sides; means for alternately supplying the highest of said plurality of pressures to one or the other of said opposite sides of said slave means and being actuated by said highest pressure supplied in response to actuation of said servo means; reset means for varying said predetermined ratio of said two of said plurality of pressures, said reset means including a double-acting valve and an additional pair of responsive means, one of said pair serving to at times actuate said double-acting valve in response to said highest pressure and the other of said pair serving to influence said first-mentioned in response to actuation of said double-acting valve.

References Cited

UNITED STATES PATENTS

| | | | |
|---|---|---|---|
| 2,146,176 | 2/1939 | Donaldson | 251—29 X |
| 2,219,359 | 10/1940 | Goit et al. | 251—29 X |
| 2,732,125 | 1/1956 | Ruby | 230—115 |
| 2,837,269 | 6/1958 | Torell. | |
| 3,137,210 | 6/1964 | Gavin | 137—108 X |
| 3,219,309 | 11/1965 | Alberani | 251—28 |
| 3,327,932 | 6/1967 | Brodell. | |

ARNOLD ROSENTHAL, *Primary Examiner.*

U.S. Cl. X.R.

137—596.14; 230—114; 251—29